United States Patent
Arumugam Maharaja

(10) Patent No.: US 11,934,255 B2
(45) Date of Patent: Mar. 19, 2024

(54) SYSTEM AND METHOD FOR IMPROVING MEMORY RESOURCE ALLOCATIONS IN DATABASE BLOCKS FOR EXECUTING TASKS

(71) Applicant: Bank of America Corporation, Charlotte, NC (US)

(72) Inventor: Raja Arumugam Maharaja, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 208 days.

(21) Appl. No.: 17/568,208

(22) Filed: Jan. 4, 2022

(65) Prior Publication Data
US 2023/0214285 A1 Jul. 6, 2023

(51) Int. Cl.
*G06F 11/07* (2006.01)
*G06F 16/22* (2019.01)
*G06F 16/2455* (2019.01)

(52) U.S. Cl.
CPC ........ *G06F 11/073* (2013.01); *G06F 16/2282* (2019.01); *G06F 16/2456* (2019.01)

(58) Field of Classification Search
CPC .............. G06F 11/073; G06F 16/2282; G06F 16/2456; G06F 9/5016; G06F 3/0629; G06F 3/0644; G06F 3/061
See application file for complete search history.

(56) References Cited

U.S. PATENT DOCUMENTS

| | | | |
|---|---|---|---|
| 7,103,763 B2 | 9/2006 | Abbey et al. |
| 7,424,666 B2 | 9/2008 | Chandwani et al. |
| 8,316,355 B2 | 11/2012 | Feng et al. |
| 8,516,493 B2 | 8/2013 | Hande et al. |
| 8,561,077 B1 | 10/2013 | Ellis et al. |
| 8,566,811 B2 | 10/2013 | Cai et al. |
| 8,732,714 B2 | 5/2014 | Vaidya et al. |
| 8,762,964 B2 | 6/2014 | Turner et al. |
| 8,850,166 B2 | 9/2014 | Jacobi et al. |
| 9,043,770 B2 | 5/2015 | Aliseychik et al. |
| 9,460,399 B1 | 10/2016 | Stacey |
| 9,569,262 B2 | 2/2017 | Modani et al. |
| 9,703,595 B2 | 7/2017 | Whitfield et al. |
| 9,910,418 B2 | 3/2018 | Mossner |
| 9,996,325 B2 | 6/2018 | Lim et al. |
| 10,025,590 B2 | 7/2018 | Capps, Jr. et al. |
| 10,374,885 B2 | 8/2019 | Liguori et al. |
| 10,496,439 B1 | 12/2019 | Dickson et al. |

(Continued)

OTHER PUBLICATIONS

Maharaja, Raja Arumugam, "System and Method for Improving Memory Resource Allocations in Database Blocks Using Blockchain," U.S. Appl. No. 17/568,382, filed Jan. 4, 2022, 53 pages.

*Primary Examiner* — Hiep T Nguyen

(57) ABSTRACT

A system for improving memory resource allocation efficiency for executing tasks receives a request to allocate a particular amount of memory resources to a particular database block of a database server. The system monitors the database blocks of the database server to determine whether any portion of memory resources already allocated to any of the database blocks is unutilized. If it is determined that a portion of the memory resources already allocated to any of the database blocks is unutilized, the system reallocates the unutilized memory resources to the particular database block.

20 Claims, 5 Drawing Sheets

(56) References Cited

U.S. PATENT DOCUMENTS

| | | | |
|---|---|---|---|
| 10,534,644 B2 | 1/2020 | Gaiarsa et al. | |
| 10,650,046 B2 | 2/2020 | Bequet et al. | |
| 10,706,164 B2 | 7/2020 | Lemay et al. | |
| 10,922,654 B2 | 2/2021 | Singi et al. | |
| 10,936,325 B2 | 3/2021 | Buendgen et al. | |
| 11,055,403 B2 | 7/2021 | Chen et al. | |
| 11,061,682 B2 | 7/2021 | Vorbach | |
| 11,119,654 B2 | 9/2021 | Zolotow et al. | |
| 2004/0034858 A1 | 2/2004 | Kushlis | |
| 2008/0229220 A1 | 9/2008 | Jing | |
| 2009/0172353 A1 | 7/2009 | Su et al. | |
| 2009/0222835 A1 | 9/2009 | Effing et al. | |
| 2009/0234878 A1 | 9/2009 | Herz et al. | |
| 2011/0099550 A1 | 4/2011 | Shafi | |
| 2012/0072758 A1 | 3/2012 | Shafi | |
| 2013/0167126 A1 | 6/2013 | Tyer et al. | |
| 2014/0006751 A1 | 1/2014 | Aliseychik et al. | |
| 2014/0258996 A1 | 9/2014 | Brackman et al. | |
| 2015/0324236 A1 | 11/2015 | Gopalan et al. | |
| 2016/0275010 A1 | 9/2016 | Ostrovsky et al. | |
| 2016/0321081 A1 | 11/2016 | Kim et al. | |
| 2018/0158034 A1 | 6/2018 | Hunt et al. | |
| 2019/0019267 A1 | 1/2019 | Suresh | |
| 2019/0042122 A1* | 2/2019 | Schmisseur | H04L 69/321 |
| 2019/0317802 A1 | 10/2019 | Bachmutsky et al. | |
| 2020/0042338 A1* | 2/2020 | Poothia | G06F 12/023 |
| 2020/0177373 A1 | 6/2020 | Komandur et al. | |
| 2020/0241856 A1 | 7/2020 | Kim et al. | |
| 2021/0004278 A1 | 1/2021 | Nishi et al. | |
| 2021/0019067 A1* | 1/2021 | Miller | G06F 3/0641 |
| 2021/0081347 A1 | 3/2021 | Liao | |
| 2021/0124492 A1 | 4/2021 | Savir et al. | |
| 2021/0141645 A1 | 5/2021 | Kramer et al. | |
| 2021/0248469 A1 | 8/2021 | Yang et al. | |
| 2021/0318897 A1 | 10/2021 | Wei et al. | |

\* cited by examiner

SYSTEM AND METHOD FOR IMPROVING MEMORY RESOURCE ALLOCATIONS IN DATABASE BLOCKS FOR EXECUTING TASKS

TECHNICAL FIELD

The present disclosure relates generally to database management, and more specifically to a system and method for improving memory resource allocations in database blocks for executing tasks.

BACKGROUND

It is challenging to determine how much memory resource is needed to be allocated for performing a task. The task will fail due to a lack of available memory resources. For example, during the execution of the task, if the task occupies memory resources more than the anticipated amount of memory resources, the task will fail. In the current technology, tasks are allocated with a fixed amount of memory resources. This amount of memory resources is static.

SUMMARY

The system described in the present disclosure is particularly integrated into a practical application of improving memory resource allocation and utilization for executing tasks. This, in turn, provides an additional practical application of improving memory resource allocation and utilization efficiency. As such, technology disclosed in the present disclosure improves memory resource allocation technologies. Further, the technology disclosed in the present disclosure improves underlying operations of computing systems that are tasked with executing the tasks. These practical applications are described below.

Improving Memory Resource Allocations in Database Blocks for Executing Tasks

This disclosure contemplates systems and methods configured to improve (e.g., optimize) memory resource allocation and utilization for executing tasks in database blocks of a database server. The database server may include multiple database blocks. Each database block may correspond to a database that stores a data table used to store data associated with a task and the results of the task. The database server may be referred to as a parent database, and the database blocks may be referred to as child databases. In current technology, in initializing the database blocks of the database server, the database blocks are allocated with a fixed amount of memory resources. This amount of resources is static and not changed during the use of database blocks. In some cases, it may be required to allocate additional memory resources to a database block.

One potential approach may be to allocate the additional memory resource to the database block from the database server (i.e., the parent database). In the current technology, the database blocks may or may not utilize memory resources allocated to them. The current technology is not configured to monitor the memory resource allocations and utilization in the database blocks to determine whether the memory resources are utilized. In contrast, the disclosed system is configured to monitor memory resource utilization in database blocks, identify unutilized memory resources, and reallocate the unutilized memory resources to other database blocks based on the need for memory resources.

In an example scenario, assume that the disclosed system receives a request to allocate a particular amount of memory resources to a particular database block of the database server for performing a task. The disclosed system monitors the database blocks of the database server to determine whether any portion of the memory resources already allocated to databases is unutilized (e.g., is idle). If the disclosed system determines that a portion of memory resources that is already allocated to a database block is unutilized, the disclosed system may reallocate the unutilized memory resources to the particular database block. Thus, the disclosed system may dynamically move (e.g., reallocate) unutilized memory resources between database blocks depending on the need for memory resources. For example, the technology disclosed in the present disclosure improves the current memory resource allocation technology by identifying memory resources that are unutilized and reallocating the unutilized memory resources to database blocks based on the need for memory resources.

In certain embodiment, the disclosed system may monitor the database blocks to identify memory resources that store duplicated data and/or skewed data. The disclosed system may provide a suggestion to delete the duplicated data and skewed data. In response to receiving approval to delete the duplicated data and skewed data, the disclosed system may delete such data, and use the freed memory resources for memory resource allocations and reallocations. In this manner, the disclosed system may improve memory resource allocation and utilization in database blocks of the database server.

In one embodiment, a system for improving memory resource allocation within a database server comprises a database server and a processor. The database server comprises a plurality of database blocks. The database server is associated with total memory resources. Each of the plurality of database blocks is configured to be used to perform a different task. The plurality of database blocks comprises a first database block and a second database block. The processor is communicatively coupled with the database server. The processor receives a first request to allocate a first amount of memory resources from among the total memory resources to the first database block to perform a first task. The processor allocates the first amount of memory resources to the first database block. The processor performs the first task using the first amount of memory resources. The processor receives a second request to allocate a second amount of memory resources to the second database block to perform a second task. The processor monitors the first database block to determine whether any portion of the first amount of memory resources is not utilized. The processor determines that a subset of the first amount of memory resources is not utilized. The processor reallocates the subset of the first amount of memory resources to the second database block.

Improving Memory Resource Allocation in Database Blocks of a Database Server Using Blockchain This disclosure further contemplates systems and methods configured to use blockchain for improving (e.g., optimizing) memory resource allocation and utilization in database blocks of a database server. In an example scenario, assume that a server receives a request to allocate a particular amount of memory resources to a particular database block to perform a task. The server communicates a blockchain transaction to a block in a blockchain network, where the blockchain transaction comprises the request. The disclosed system provides suggestions to either approve or disapprove the blockchain transaction based on historical blockchain transactions and historical memory resource allocations for performing the task using the particular amount of memory resources. If the blockchain transaction is approved, the disclosed system (e.g., via the blockchain network) generates a new block in the blockchain network indicating the allocation of the particular amount of memory resources to the particular database block.

The disclosed system may generate a new block in the blockchain network for each approved blockchain transaction. The disclosed system monitors memory resource allocations and utilizations in database blocks of the database server. The disclosed system may provide suggestions for reallocating unutilized memory resources (previously allocated to any of the database blocks) to other database blocks where memory resources are needed to perform a task. The disclosed system may distribute the status of memory resource allocations, reallocations, and utilizations among blocks of the blockchain network. For example, the disclosed system may distribute the status of memory resources that are idle (e.g., unutilized), memory resources that store duplicated data, and memory resources that store skewed data among the blocks of the blockchain network. The disclosed system may use this information in providing recommendations for memory resource allocations and reallocations among database blocks. In this manner, the disclosed system may improve memory resource allocations and utilizations in database blocks of the database server. For example, the disclosed system may reduce (or minimize) unutilized memory resources by reallocating them to a database block where memory resources are needed to perform a task. In another example, the disclosed system may reduce (or minimize) memory resources that store duplicated data by recommending to remove the duplicated data and reallocate the memory resources to a database block where memory resources are needed to perform a task. In another example, the disclosed system may reduce (or minimize) memory resources that store skewed data by recommending to remove the skewed data and reallocate the memory resources to a database block where memory resources are needed to perform a task.

In one embodiment, a system for improving memory resource allocation in database blocks of a database server using blockchain comprises a database server, a blockchain network, and a processor. The database server comprises a plurality of database blocks. The database server is associated with total memory resources. Each of the plurality of database blocks is configured to be used to perform a different task. The plurality of database blocks comprises a first database block and a second database block. The blockchain network comprises a first block associated with the database server. The processor is communicatively coupled with the database server and the blockchain network. The processor receives a first request to allocate a first amount of memory resources from among the total memory resources to the first database block to perform a first task. The processor communicates a first blockchain transaction to the first block, where the first blockchain transaction comprises the first request. The processor approves the first blockchain transaction based at least in part upon historical memory resource allocations to perform the first task using the first amount of memory resources. The processor receives a first message from the first block that indicates a second block is generates in the blockchain network. The generation of the second block is in response to the first blockchain transaction being approved. The second block stores allocation of the first amount of memory resources to the first database block. The second block is associated with the first database block. The processor performs the first task using the first amount of memory resources. The processor receives a second request to allocate a second amount of memory resources to the second database block to perform a second task. The processor monitors the first database block to determine whether any portion of the first amount of memory resources is not utilized. The processor determines that a subset of the first amount of memory resources is not utilized. The processor communicates a second blockchain transaction to the first block, where the second blockchain transaction comprises the second request. The processor approves the second blockchain transaction based at least in part upon historical memory resource allocations to perform the second task using the second amount of memory resources. The processor receives a second message from the first block that indicates a third block is generated in the blockchain network. The generation of the third block is in response to the second blockchain transaction being approved. The third block stores reallocation of the subset of the first amount of memory resources to the second database block. The third block is associated with the second database block.

Accordingly, the disclosed system provides several practical applications and technical advantages, which include, at least: 1) technology that improves memory resource allocation and utilization for executing tasks in database blocks of a database server; 2) technology that improves memory resource utilization by identifying unutilized memory resources, memory resources that store duplicated data, and memory resources that store skewed data, and reallocate the unutilized memory resources, and provide a suggestion to delete the duplicated data and skewed data; 3) technology that provides recommendations for memory resource allocation and reallocation among database blocks of a database server based on historical memory resource allocations and reallocations; and 4) technology that distributes memory resource allocations, reallocations, and utilizations among the database blocks, and uses this information to update recommendations for current and future memory resource allocation and reallocation among the database blocks.

As such, the disclosed system may be integrated into a practical application of improving (e.g., optimizing) memory resource allocation and utilization for executing tasks. For example, by implementing the disclosed system, there may be no (or minimum) memory resources that are unutilized, store duplicated data, and/or store skewed data. Thus, the disclosed system may improve the current memory resource allocation technology.

The disclosed system may further be integrated into an additional practical application of improving the underlying operations of systems, including computing systems and databases that serve to perform the tasks. For example, by improving (e.g., optimizing) the memory resource allocation and utilization, fewer memory resources are wasted, remain idle, occupy useless or redundant data. In another example, by improving (e.g., optimizing) the memory resource allocation and utilization, less processing capacity of a computer system that is employed to perform the task is occupied. This, in turn, provides an additional practical application of improving the processing capacity utilization.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to improve memory resource allocation and utilization for task execution. This disclosure provides various systems and methods to improve (e.g., optimize) memory resource allocation and utilization for task execution. Embodiments of the present disclosure and its advantages may be understood by referring to FIGS. 1 through 5. FIGS. 1 through 5 are used to describe systems and methods for improving (e.g., optimizing) memory source allocation and utilization for executing tasks, and systems and methods for memory source allocation using blockchain.

Example System for Improving Memory Source Allocation for Executing Tasks

Figure 1:
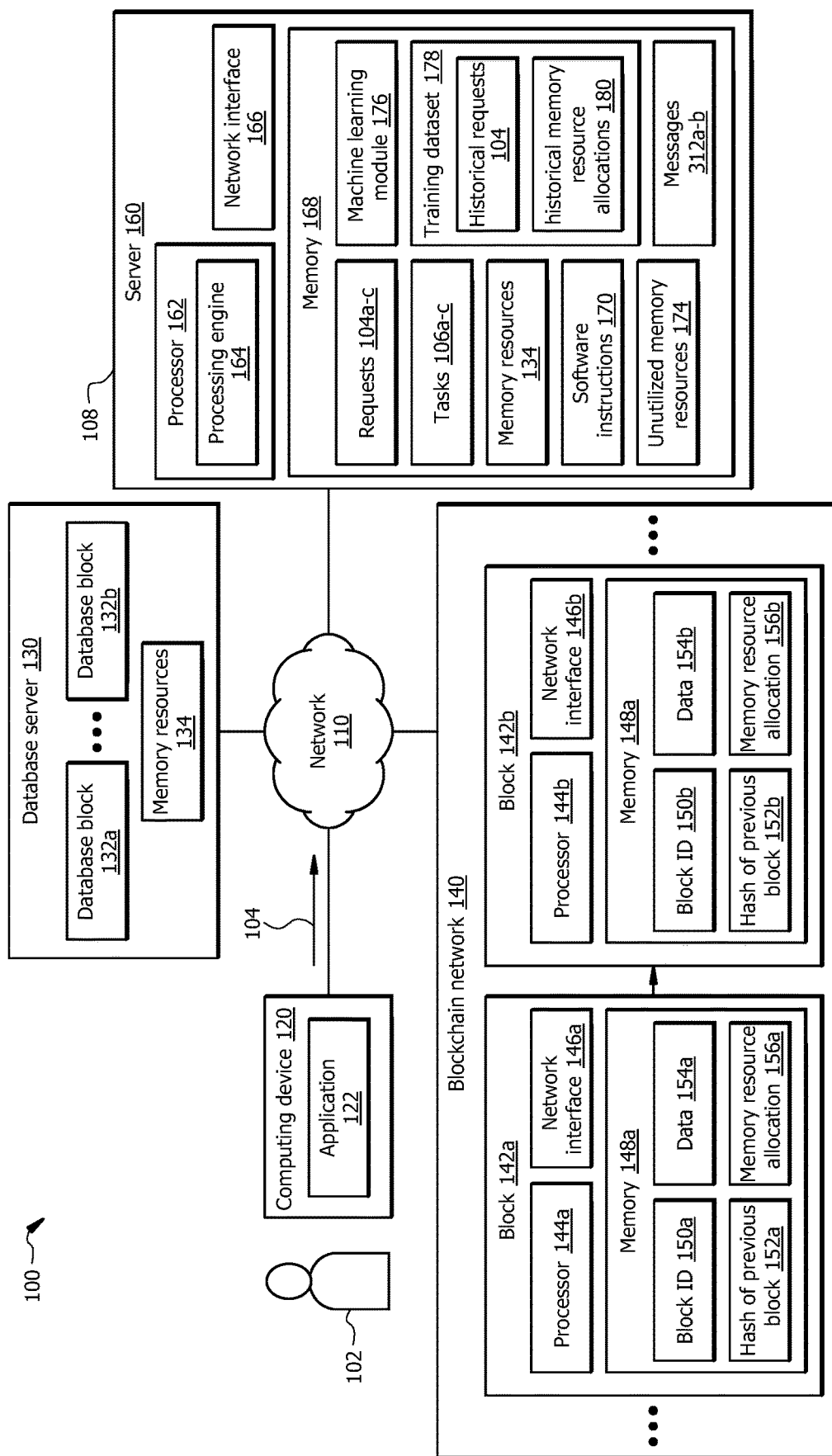
FIG. 1 illustrates one embodiment of a system that is configured to improve memory allocation for executing tasks.

FIG. 1 illustrates one embodiment of a system 100 that is configured to improve (e.g., optimize) memory allocation and utilization for executing tasks 106. In one embodiment, system 100 comprises a network 110, a computing device 120, a database server 130, a blockchain network 140, and a server 160. Network 110 enables the communication between components of the system 100. Computing device 120 may be any device used by a user 102. Database server 130 may comprise a plurality of database blocks 132. Database server 130 may be associated with total memory resources 134. Any portion of the total memory resources 134 may be configured to be allocated to any of the database blocks 132. Blockchain network 140 may comprise one or more blocks 142. Blockchain network 140 may generally be configured to keep records of memory resource allocations to the database blocks 132. Server 160 comprises a processor 162 in signal communication with a memory 168. Memory 168 stores software instructions 170 that when executed by the processor 162, cause the server 160 to perform one or more functions described here. For example, when the software instructions 170 are executed, the server 160 executes a processing engine 164 to allocate memory resources 134 to a database block 132 according to suggestions of available and unutilized memory resources 174 recommended by a machine learning module 176. In other embodiments, system 100 may not have all of the components listed and/or may have other elements instead of, or in addition to, those listed above.

In general, system 100 (at the server 160) may receive a first request 104a to allocate a first amount of memory resources 134a to a first database block 132a to perform a first task 106a. The processing engine 164 determines available (e.g., unutilized) memory resources 134 from among the total memory resources 134. The processing engine 164 may allocate the first amount of memory resources 134a to the first database block 132a. The processing engine 164 may continuously or periodically (e.g., every minute, every two minutes, or any suitable duration) monitor memory resource utilization in database blocks 132a to 132b. For example, the processing engine 164 may monitor the first database block 132a to determine whether any portion of the first amount of memory resource 134a (allocated to the first database block 132a) is not utilized. The system 100 (at the server 160) may receive a second request 104b to allocate a second amount of memory resources 134b to a second database block 132b to perform a second task 106b. While monitoring the database blocks 132, assume that the processing engine 164 determines that a subset of the first amount of memory resources 134a is not utilized (or is no longer utilized). The processing engine 164 may move (e.g., reallocate) the subset of the first amount of memory resources 134a from the first database block 132a to the second database block 132b. In this manner, the system 100 may dynamically allocate and reallocate (e.g., move) memory resources 134 between database blocks 132 to improve (e.g. optimize) the memory resource allocation and utilization for executing tasks 106.

System Components

Network

Network 110 may include any interconnecting system capable of transmitting audio, video, signals, data, messages, or any combination of the preceding. Network 110 may include all or a portion of an Internet, an Intranet, a private network, a public network, a peer-to-peer network, the public switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMax, etc.), a long term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network.

Computing Device

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120. The system 100 may include any number of computing devices 120. For example, system 100 may include multiple computing devices 120 that are associated with an organization 108, where the server 160 is also associated with the same organization 108 and is configured to communicate with the computing devices 120, e.g., via the network 110.

The computing device 120 is configured to communicate requests 104 to the server 160. Each request 104 may indicate to allocate a particular amount of memory resources 134 to a particular database block 132 to perform a particular task 106. The computing device 120 is configured to store an application 122. The application 122 may include a software, mobile, and/or web application that the user 102 can interact with. The application 122 may include user interfaces and allow the user 102 to access the database server 130 and the blockchain network 140. For example, the user 102 can access any of the database blocks 132 of the database server 130 from the application 122. In another example, the user 102 can access the blockchain network 140 from the application 122. The task 106 may be developing a website, developing a software solution (e.g., software application), developing a module solution (e.g., module application), developing a web solution (e.g., web application), and/or any other task 106. In other examples, the task 106 may include performing an operation that a user 102 has requested, such as performing operations on data tables, e.g., joint operation, search query, query statement, and the like.

Database Server

Database server 130 is generally a device that is configured to store data, and may be used as a repository for storing data, querying data, and/or performing operations on data. The database server 130 may include one or more servers located in one or more data centers. The database server 130 may be implemented by any storage architecture. Examples of the database server 130 include, but are not limited to, a database, a virtual machine, a network-attached storage cloud, a storage area network, a database management system (DBMS) server, relational DBMS (RDBMS) server, and a storage assembly directly (or indirectly) coupled to one or more components of the system 100. The database server 130 may include a plurality of database blocks 132. Each database block 132 may be configured to store any data and/or instruction. For example, each database block 132 may be a cluster in the database server 130. Each database block 132 may include a database table used to store data associated with a task 106. In certain embodiments, the database server 130 may be referred to as a parent database, and the database blocks 132 may be referred to as child databases. In this manner, the database server 130 and the database blocks 132 may have a parent-child relationship.

Blockchain Network

Blockchain network 140 comprises a cloud of computer systems (referred to herein as blocks 142) and is generally configured to keep records of memory resources allocations and utilizations in database blocks 132, and communications and interactions among the blocks 142. The blockchain network 140 may comprise any number of nodes 142. Each block 142 may comprise a computing device, a virtual machine, and/or the like. In the present disclosure, a block 142 may interchangeably be referred to as a network node or a network device 142. The blockchain network 140 generally referred to a database shared by a plurality of network nodes 142 in a network. The system 100 may employ any suitable number of devices (e.g., network nodes 142) to form a distributed network that maintains the records of memory resource allocations for database blocks 132 in form of a blockchain. The blockchain links together the blocks 142 of data which may include memory resource allocation and utilization for database blocks 132. Each of the network nodes 142a and 142n is an instance of a network node 142. Each network node 142 may comprise a processor 144 in signal communication with a memory 148 and a network interface 146.

Processor 144 comprises one or more processors operably coupled to the memory 148. The processor 144 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 144 may be a programmable logic device, a microcontroller, a microprocessor, or any suitable combination of the preceding. The one or more processors are configured to process data and may be implemented in hardware or software. For example, the processor 144 may be 8-bit, 16-bit, 32-bit, 64-bit, or of any other suitable architecture. The processor 144 may include an arithmetic logic unit (ALU) for performing arithmetic and logic operations. The processor 144 may register the supply operands to the ALU and stores the results of ALU operations. The processor 144 may further include a control unit that fetches instructions from memory and executes them by directing the coordinated operations of the ALU, registers and other components. The one or more processors are configured to implement various software instructions. For example, the one or more processors are configured to execute software instructions to perform one or more functions described herein. In this way, processor 144 may be a special-purpose computer designed to implement the functions disclosed herein. In an embodiment, the processor 144 is implemented using logic units, FPGAs, ASICs, DSPs, or any other suitable hardware. The processor 144 is configured to operate as described in FIGS. 1-5.

Network interface 146 is configured to enable wired and/or wireless communications (e.g., via network 110). The network interface 146 is configured to communicate data between the network node 142 and other devices (e.g., computing devices 120), servers 160, other network nodes 142, database server 130, databases, systems, or domains. For example, the network interface 146 may comprise a WIFI interface, a local area network (LAN) interface, a wide area network (WAN) interface, a modem, a switch, or a router. The processor 144 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. The memory 148 may store any of the information described in FIGS. 1-5 along with any other data, instructions, logic, rules, or code operable to implement the function(s) described herein when executed by processors 144. The memory 148 is operable to store block identifier (ID) 150, hash 152 of previous block 142, data 154, and/or any other data and instructions. The block ID 150 may be used to uniquely identify the corresponding network node 142. For example, the block ID 150 may include an alphanumerical serial value. The hash 152 of the previous block 142 may include a hash value 152 of the previous block 142 generated before the corresponding block 142. The order and place of the block 142 in the blockchain 140 may be determined by the hash 152 of the previous block 142. The data 154 may comprise any suitable set of software instructions, logic, rules, or code operable to execute the processor 144 to perform the functions of the processor 144 and the block 142 described herein. The memory resource allocation 156 may include memory resources 134 allocated to its respective database block 132. The memory resource allocation 156 may further include utilization of memory resources 134 allocated to its respective database block 132.

Each block 142 may include information derived from a preceding block 142. For example, every block 142 in the blockchain includes a hash 152 of the previous block 142. By including the hash 152 of the previous block 142, the blockchain network 140 includes a chain of blocks 142a to 142n from a genesis block 142a (or a block not shown to the left of the block 142a in the example of FIG. 1) to the latest block 142n (or a block not shown to the right of the block 142n in the example of FIG. 1). Each block 142 is guaranteed to come after the previous block 142 chronologically because the previous block's hash value 152 would otherwise not be known.

In an example operation, when a user 102 sends a request 104 to allocate memory resources 134 to a database block 132 to the server 160, the server 160 may transmit the request 104 to the blockchain network 140. Upon approval by the server 160 (e.g., via the machine learning module 176 and/or a user associated with the block 142a), the blockchain network 140 may generate a new block 142 for the request 104 and store memory resource allocation 156 that indicates the requested memory resources 134 are allocated to the corresponding database block 132. The blockchain 140 adds the newly generated block 142 to the existing blocks 142. The newly generated block 142 may be generated by one or more processors (e.g., processors 144) operably coupled with the components of the blockchain network 140 and/or the system 100. In another example, the newly generated block 142 may be generated by a processor associated with a server configured to create and store the block 142 in the blockchain network 140, and oversee operations within the blockchain network 140. In another example, the newly generated block 142 may be generated by the processor 162 associated with the server 160. The newly generated block 142 may store memory resource allocation 156, corresponding block ID 150, hash 152 of the previous block 142, data 154, and/or any other data. The one or more processors 144 associated with the blockchain network 140 may receive a confirmation that indicates the new block 142 is generated and memory resources 134 are allocated to the corresponding database block 132 as indicated in the request 104. This operation is described in greater detail further below in conjunction with FIG. 3.

Server

Server 160 is generally a device that is configured to process data and communicate with computing devices (e.g., computing devices 120), database server 130, databases, blockchain network 140, etc., via the network 110. The server 160 is generally configured to oversee the operations of the processing engine 164, as described further below in conjunction with the operational flow 200 of system 100 for improving (e.g., optimizing) memory resource allocation and utilization described in FIG. 2, operational flow 300 of system 100 for generating a block 142 for memory allocations to a database block 132 described in FIG. 3, method 400 described in FIG. 4, and method 500 described in FIG. 5.

Processor 162 comprises one or more processors operably coupled to the memory 168 and the network interface 166. The processor 162 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 162 may be a programmable logic device, a microcontroller, a microprocessor, or any suitable combination of the preceding. The one or more processors are configured to process data and may be implemented in hardware or software. For example, the processor 162 may be 8-bit, 16-bit, 32-bit, 64-bit, or of any other suitable architecture. The processor 162 may include an arithmetic logic unit (ALU) for performing arithmetic and logic operations. The processor 162 may register the supply operands to the ALU and store the results of ALU operations. The processor 162 may further include a control unit that fetches instructions from memory and executes them by directing the coordinated operations of the ALU, registers and other components. The one or more processors are configured to implement various instructions. For example, the one or more processors are configured to execute instructions (e.g., software instructions 170) to implement the processing engine 164. In this way, processor 162 may be a special-purpose computer designed to implement the functions disclosed herein. In an embodiment, the processor 162 is implemented using logic units, FPGAs, ASICs, DSPs, or any other suitable hardware. The processor 162 is configured to operate as described in FIGS. 1-5. For example, the processor 162 may be configured to perform one or more operations of method 400 as described in FIG. 4 and one or more operations of method 500 as described in FIG. 5.

Network interface 166 is configured to enable wired and/or wireless communications (e.g., via network 110). The network interface 166 is configured to communicate data between the server 160 and other devices (e.g., computing devices 120), database server 130, blockchain network 140, databases, systems, or domains. For example, the network interface 166 may comprise a WIFI interface, a local area network (LAN) interface, a wide area network (WAN) interface, a modem, a switch, or a router. The processor 162 is configured to send and receive data using the network interface 166. The network interface 166 may be configured to use any suitable type of communication protocol as would be appreciated by one of ordinary skill in the art.

Memory 168 may be volatile or non-volatile and may comprise a read-only memory (ROM), random-access memory (RAM), ternary content-addressable memory (TCAM), dynamic random-access memory (DRAM), and static random-access memory (SRAM). Memory 168 may be implemented using one or more disks, tape drives, solid-state drives, and/or the like. The memory 168 may store any of the information described in FIGS. 1-5 along with any other data, instructions, logic, rules, or code operable to implement the function(s) described herein when executed by processors 162. The memory 168 is operable to store the software instructions 170, requests 104a-c, tasks 106a-c, memory resources 134, unutilized memory resources 174, machine learning module 176, training dataset 178, messages 312a-b, and/or any other data or instructions. The software instructions 170 may comprise any suitable set of instructions, logic, rules, or code operable to execute the processor 162.

Processing Engine

Processing engine 164 may be implemented by the processor 162 executing the software instructions 170, and is generally configured to perform one or more operations described herein. For example, the processing engine 164 may be configured to allocate memory resources 134 to database blocks 132, identify utilized memory resources 134 in database blocks 132, identify unutilized memory resources 174 in database blocks 132, reallocate utilized memory resources 174 from one or more database blocks 132 to a particular database block 132 (based on a request 104 to allocate memory resources 134 to the particular database block 132), provide recommendation for memory resource allocations for database blocks 132, and/or any other operations. The operations of the processing engine 164 are described in greater detail further below in conjunction with the operational flow 200 of system 100 described in FIG. 2, the operational flow 300 of system 100 described in FIG. 3, method 400 described in FIG. 4, and method 500 described in FIG. 5.

In certain embodiments, the processing engine 164 may be implemented by supervised machine learning, semi-supervised machine learning, and/or unsupervised machine learning module 176. For example, the machine learning module 176 may comprise a support vector machine, neural network, random forest, k-means clustering, etc. In another example, the machine learning module 176 may be implemented by a plurality of neural network (NN) layers, Convolutional NN (CNN) layers, Long-Short-Term-Memory (LSTM) layers, Bi-directional LSTM layers, Recurrent NN (RNN) layers, and the like.

For example, in the training process of the machine learning module 176, the process of memory resource allocation to database blocks 132 may be performed manually by one or more users, operators, database administrators. For example, when a request 104 is received to allocate a particular amount of memory resources 134 to a particular database block 132 to perform a particular task 106, a database administrator may determine whether the request 104 can be approved based on the application and use of the particular task 106, and whether the particular amount of memory resources 134 is required to perform the task 106. The database administrator may approve, reject, or revise the request 104, e.g., by revising the requested memory resources 134. The machine learning module 176 may learn from the selection and behavior of the database administrator with respect to the request 104.

Similarly, during the training process, multiple requests 104 may be received. The process of memory resource allocation to database blocks 132 may be performed manually for the multiple requests 104. The machine learning module 176 may learn from the selection and behavior of the database administrator with respect to the requests 104. In this process, the machine learning module 176 may extract features of each request 104 by feeding each request 104 to a neural network. The features of a request 104 may be represented by a vector of numerical values. The features of the request 104 may represent the requested amount of memory resources 134, the task 106 (indicated in the request 104), the database block 132 (indicated in the request 104), time of day when the request 104 is received, calendar date when the request 104 is received, and/or any other aspect of the request 104. The machine learning module 176 may associate the features of the request 104 to the outcome (or result) of the memory resource allocation requested in the request 104. In this manner, the machine learning module 176 may learn to associate features of each request 104 to its corresponding memory resource allocation result (and its corresponding memory resource utilization. For example, the machine learning module 176 may learn that 85% 80%, etc. of the allocated memory resources 134 requested for a task 106 in a request 104 are utilized.

The machine learning module 176 may generate a training dataset 178 that comprises multiple historical requests 104 each labeled with corresponding features, result of memory resource allocation requested in the request 104, and its respective memory resource utilization. The training dataset 178 may further include historical memory allocations 180. The historical memory resource allocation 180 may indicate the amount of allocated memory resources 134, the source(s) of the allocated memory resources 134 (e.g., which database block(s) 132, the database server 130), and the utilization of the allocated memory resources 134 (e.g., 80%, 85%, etc. of the allocated memory resources 134 are utilized). The processing engine 164 and the machine learning module 176 may use the training dataset 178 to provide a suggestion for memory resource allocation of future requests 104.

During the testing process of the machine learning module 176, the machine learning module 176 may be given a new request 104 that is not labeled with features or result of memory resource allocation and is asked to provide a suggestion for memory resource allocation and determine whether it can be approved, revised, or denied. For example, the new request 104 may indicate to allocate a particular amount of memory resources 134 to a particular database block 132 to perform a particular task 106. The processing engine 164 (e.g., via the machine learning module 176) may analyze the new request 104.

The processing engine 164 (e.g., via the machine learning module 176) may provide a suggestion for memory resource allocation and whether it can be approved, revised, or denied based on the training dataset 178. In this process, the processing engine 164 may extract features of the new request 104, similar to that described above. The processing engine 164 may compare the features of the new request 104 with features of historical requests 104 from the training dataset 178. The processing engine 164 may determine the result of the memory resource allocation of the new request 104 matches (or corresponds) to a historical memory resource allocation 180 of a historical request 104 has matching (or corresponding) features with the new request 104.

In certain embodiments, the processing engine 164 may be configured to provide details about memory resources 134 allocated to any database block 132 that are unutilized, store duplicated data, and/or store skewed data. For example, the processing engine 164 may continuously or periodically (e.g., every minute, every two minutes, or any suitable duration) monitor memory resource utilization in database blocks 132. If a memory resource 134 allocated to a database 132 is not utilized, the processing engine 164 may determine that the memory resource 134 is unutilized. The processing engine 164 may use this information for memory resource allocation and reallocation for database blocks 132.

In certain embodiments, the processing engine 164 may be configured to provide suggestions for moving (e.g., allocating and reallocating) memory resources 134 between database blocks 132 based on their memory resource utilization, training dataset 178, and newly received requests 104. For example, the processing engine 164 may suggest reallocating memory resources 134 already allocated to any database block 132 that are unutilized, store duplicated data, and/or store skewed data to a particular database block 132 that is indicated in a new request 104 to allocate memory resources thereto.

In certain embodiments, the processing engine 164 may be configured to suggest deleting duplicate data and/or skewed data stored in memory resources 134 of any database block 132. For example, the processing engine 164 may suggest to a user or an operator associated with a database block 132 that includes memory resources 134 that store duplicated data, and/or store skewed data, to delete the duplicate data and/or skewed data. The operator can confirm, revise, override the suggestion of the processing engine 164. The processing engine 164 may learn from the action of the operator and include the result of the suggestion to the training dataset 178 to be used for future suggestions and memory resource allocations indicated in future requests 104.

Figure 2:
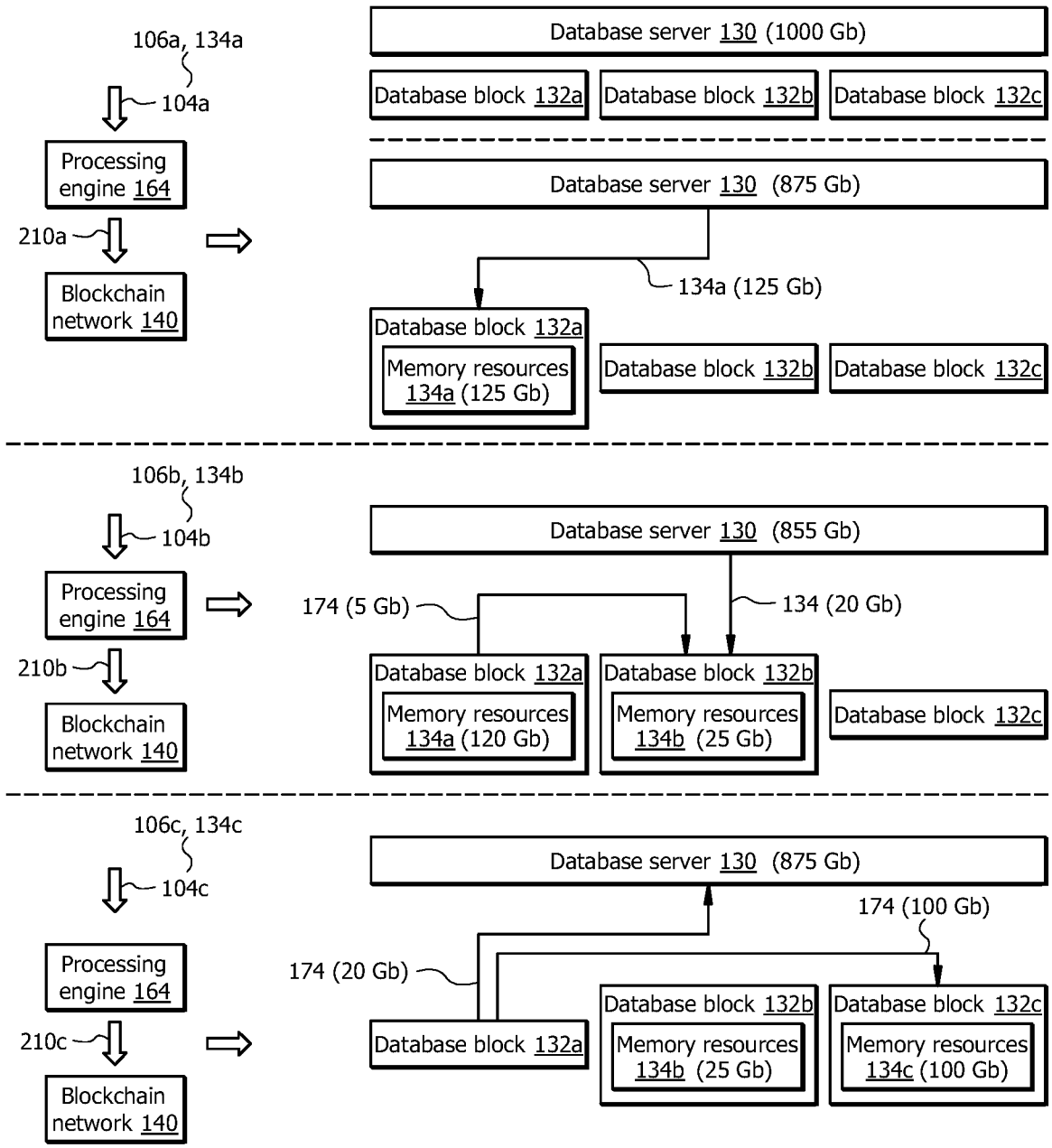
FIG. 2 illustrates an example operational flow of the system of FIG. 1 for improving memory resource allocation.
Figure 3:
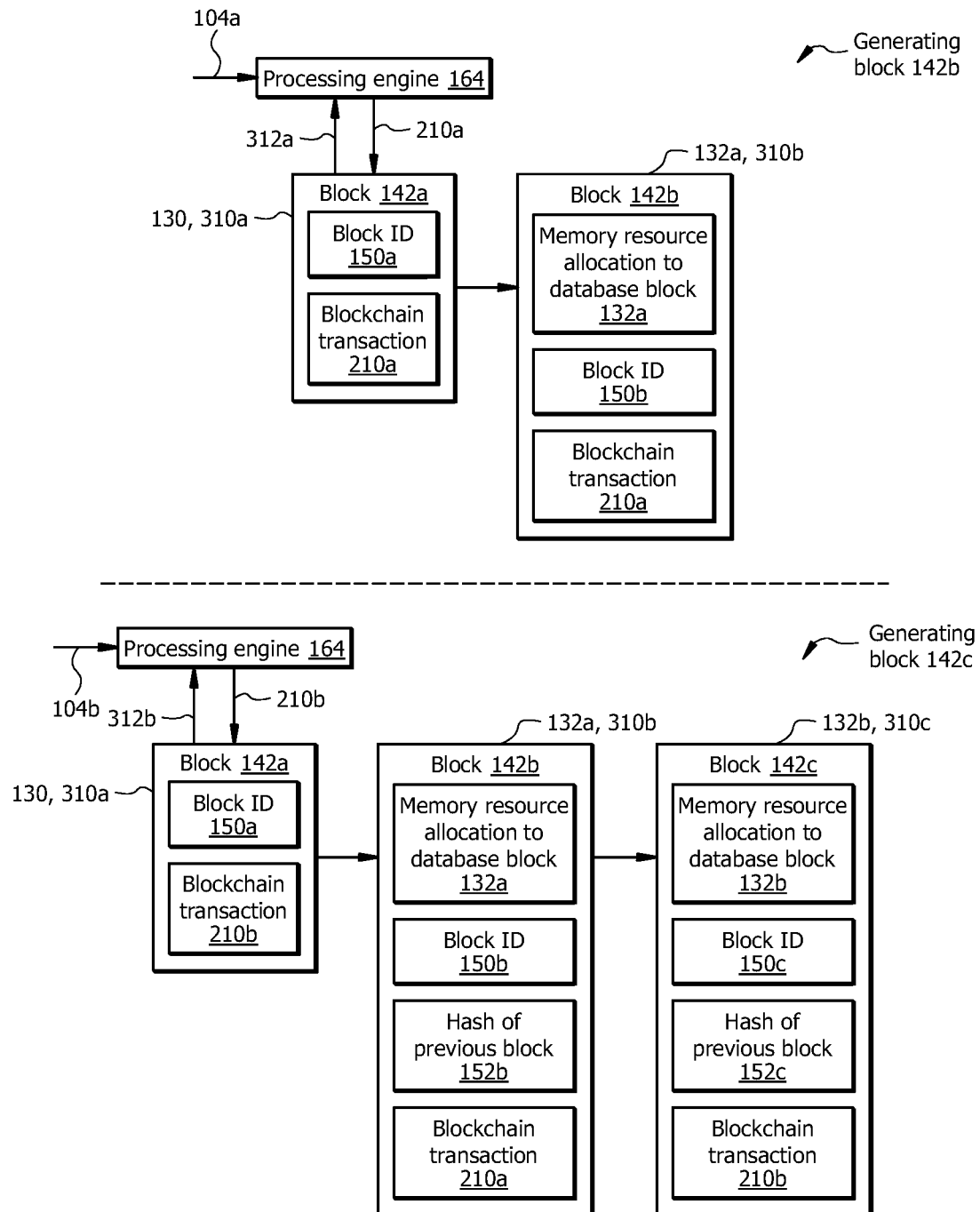
FIG. 3 illustrates an example operational flow of the system of FIG. 1 for generating a block in a blockchain for a memory resource allocation to a database block.
Figure 4:
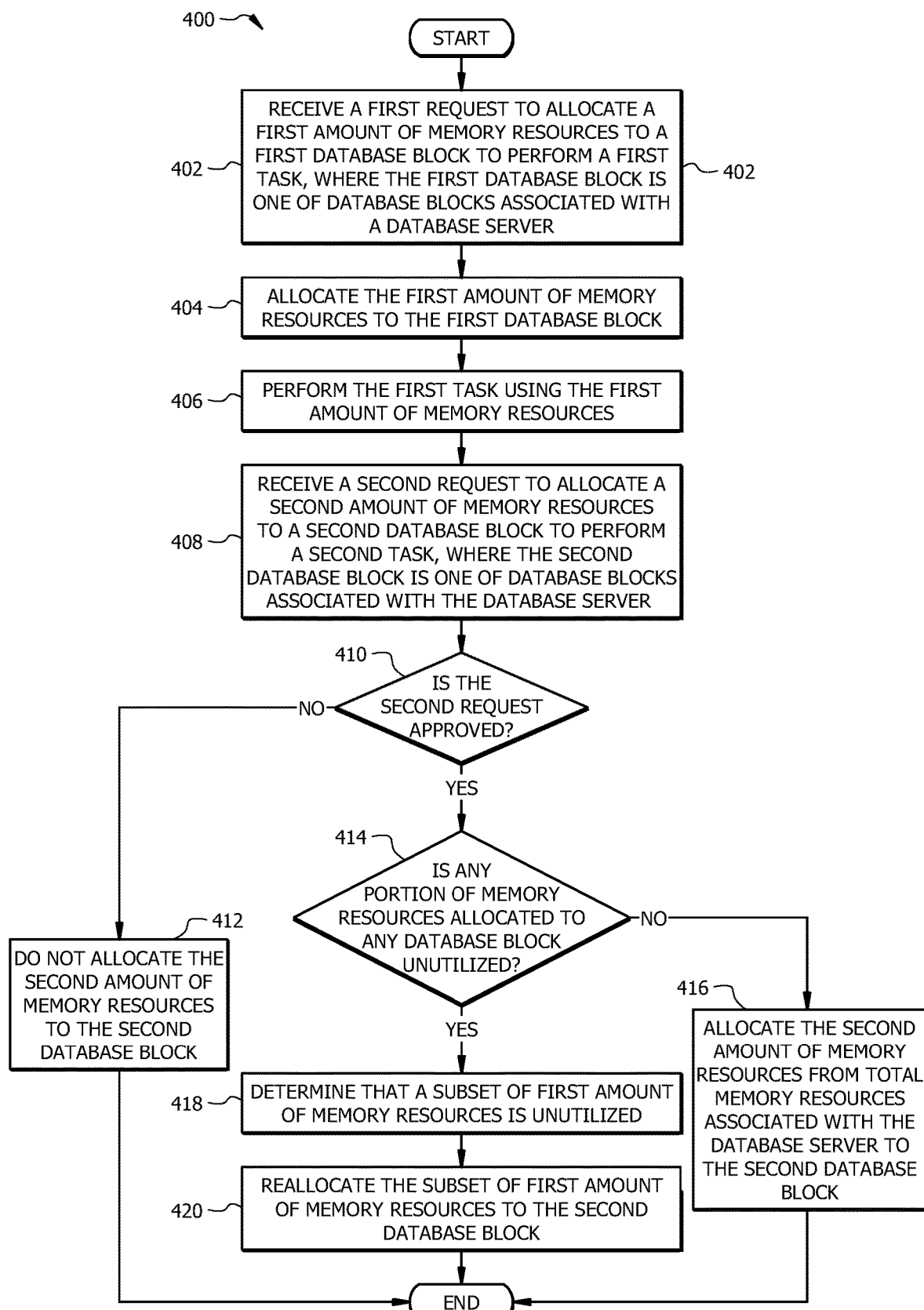
FIG. 4 illustrates an example flowchart of a method for improving memory resource allocation for executing tasks.
Figure 5:
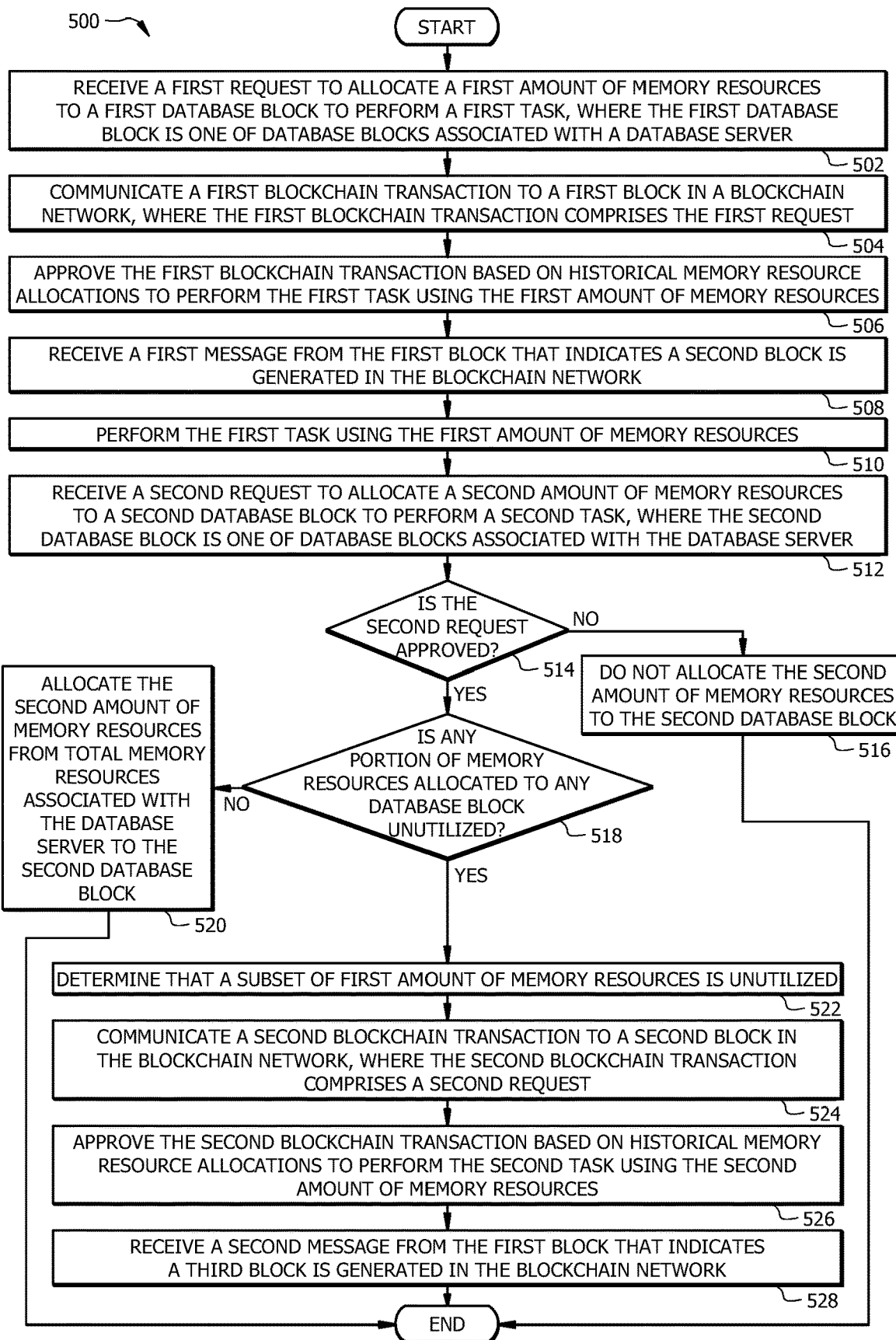
FIG. 5 illustrates an example flowchart of a method for improving memory resource allocation in database blocks of a database server using blockchain.

These operations are described in greater detail in conjunction with the operational flow 200 of system 100 for improving (e.g., optimizing) memory resource allocation described in FIG. 2, operational flow 300 of system 100 for generating a block 142 for memory resource allocations to a database block 132 described in FIG. 3, method 400 described in FIG. 4, and method 500 described in FIG. 5.

Operational Flow for Improving Memory Resource Allocations for Executing Task

FIG. 2 illustrates an example operational flow 200 of system 100 of FIG. 1 for improving (e.g., optimizing) memory resource allocation. In the example FIG. 2, assume that the database server 130 includes at least three database blocks 132a, 132b, and 132c. Further, in the example of FIG. 2, assume that the total memory resources 134 of the database server 130 is a particular amount, e.g., 1000 Giga bits (Gb). Also, assume that the database blocks 132 of the database server 130 have not been allocated with any memory resource 134 yet.

In an example scenario, assume that the processing engine 164 receives a request 104a to allocate a first amount of memory resources 134a to the first database block 132a to perform a first task 106a. The processing engine 164 may receive the request 104a from the computing device 120 when the user 102 initiates the request 104a. For example, assume that the first amount of memory resources 134a is 125 Gb.

In one embodiment, the processing engine 164 may send this information (e.g., the request 104a) as a blockchain transaction 210a to the blockchain network 140. The blockchain transaction 210a may include details about the request 104a, such as it is requested to allocate the first amount of memory resources 134a to the first database block 132a to perform the first task 106a. The blockchain network 140 may generate a new block 142 to store information associated with the blockchain transaction 210a and the request 104a. This process is described in FIG. 3. Referring to FIG. 3, the block 142a may receive the blockchain transaction 210a. The block 142a may be associated with the database server 130. The block 142a may also be associated with a data owner 310a. The data owner 310a may be a user, an administrator, or an operator who has access to the database server 130, and oversee operations of the database server 130. The block 142a may store the blockchain transaction 210a. The blockchain transaction 210a and/or any other data stored in the block 142a may be stored in data 154a in memory 148a described in FIG. 1. The block 142a may uniquely be identified by the block ID 150a, similar to that described in FIG. 1.

If the data owner 310a approves the blockchain transaction 210a, the blockchain network 140 generates a new block 142b to store information associated with the blockchain transaction 210a and the request 104a. The block 142b may be associated with the database block 132a. The block 142b may further be associated with a data owner 310b. The data owner 310b may be a user, an administrator, or an operator who has access to the database block 132a, and oversee operations of the database block 132a. The block 142b may store the blockchain transaction 210a. Block 142b may also store memory resource allocation to the database block 132a that is approved by the data owner 310a. The blockchain transaction 210a and/or any other data stored in the block 142b may be stored in data 154b in memory 148b described in FIG. 1. The block 142b may uniquely identified by the block ID 150b, similar to that described in FIG. 1. The block 142a may send a message 312a to the processing engine 164 indicating that the block 142b is generated.

In one embodiment, the machine learning module 176 may learn from the behavior of the data owner 310a approving and disapproving blockchain transactions 210 for memory resource allocations to database blocks 132. For example, historical blockchain transactions 210, their respective approval/disapproval indications, memory resource allocations, tasks 106, and other information associated with the historical blockchain transactions 210 may be added to the training dataset 178. The machine learning module 176 may be fed each historical blockchain transaction 210 and its respective approval/disapproval indications, memory resource allocations, tasks 106, etc. The machine learning module 176 may extract features of the historical blockchain transaction 210 and its respective associated information listed above. The extracted features may be represented by vector of numerical values. The machine learning module 176 may learn to associate each historical blockchain transaction 210 with its respective features. Thus, when a future blockchain transaction 210 is received, the processing engine 164 (via the machine learning module 176) may extract its features and determine the extracted features correspond (or match) with which historical blockchain transaction(s) 210. The processing engine 164 may approve/disapprove (or suggest to approve/disapprove) the blockchain transaction 210 based on the historical blockchain transactions 210. In this manner, over time, the process of approving and disapproving blockchain transactions 210 may be performed by the processing engine 164.

Referring back to FIG. 3, in response to the approval of memory resource allocation to database block 132a, the processing engine 164 may allocate the first amount of memory resources 134a from the total memory resources 134 to the first database block 132a. Thus, the database block 132a is allocated with (or receives) the first amount of memory resources 134a. In the example of FIG. 2, after allocating the first amount of memory resources 134a to the first database block 132a, the database server 130 may be associated with 875 Gb, and the first database block 132a may be associated with 125 Gb. The processing engine 164 may perform the task 106a using the first amount of memory resources 134a in the first database block 132a.

Allocating Memory Resources to a Second Database Block from Unutilized Memory Resources Continuing the example scenario above, assume that the processing engine 164 receives a request 104b that indicates to allocate a second amount of memory resources 134b to the second database block 132b to perform a second task 106b. For example, the processing engine 164 may receive the request 104b from the computing device 120 when the user 102 initiates the request 104b. For example, assume that the second amount of memory resources 134b is 25 Gb.

In certain embodiments, the processing engine 164 may send this information (e.g., the request 104b) as a blockchain transaction 210b to the blockchain network 140. The blockchain transaction 210b may include details about the request 104b, such as it is requested to allocate the second amount of memory resources 134b to the second database block 132b to perform the second task 106b. The blockchain network 140 may generate a new block 142 to store information associated with the blockchain transaction 210b and the request 104b. This process is described in FIG. 3.

Referring to FIG. 3, the block 142a may receive the blockchain transaction 210b. If the data owner 310a approves the blockchain transaction 210b, the blockchain network 140 generates a new block 142c to store information associated with the blockchain transaction 210b and the request 104b. The block 142c may be associated with the database block 132c. The block 142c may further be associated with a data owner 310c. The data owner 310c may be a user, an administrator, or an operator who has access to the database block 132c, and oversee operations of the database block 132c.

The block 142c may store the blockchain transaction 210b. Block 142c may also store memory resource allocation to the database block 132b that is approved by the data owner 310a. The blockchain transaction 210b and/or any other data stored in the block 142c may be stored in data 154 in a memory 148 of the block 142c, similar to that described in FIG. 1 with respect to blocks 142a and 142b. The block 142c may uniquely be identified by the block ID 150c. The block 142a may send a message 312b to the processing engine 164 indicating that the block 142c is generated.

In response to the approval of memory allocation to database block 132b, the processing engine 164 may allocate the requested memory resources 134b to the database block 132b, as described in FIG. 3.

Referring back to FIG. 2, the processing engine 164 may monitor the database blocks 132 to determine whether any memory resource 134 allocated to any of the database blocks 132 is unutilized (i.e., not utilized). For example, the processing engine 164 may determine that a memory resource 134 is unutilized if the memory resource 134 is idle and/or if the memory resource 134 is not used to perform a task 106.

In certain embodiments, the processing engine 164 may determine whether data stored in a memory resource 134 allocated in any of the database blocks 132 is duplicated data. For example, the processing engine 164 may determine that data stored in a memory resource 134 of a particular database block 132 is duplicate data if the data is the same (or the duplicate) of another data stored in the particular database block 132.

In certain embodiments, the processing engine 164 may determine whether data stored in a memory resource 134 allocated in any of the database blocks 132 is skewed data. The processing engine 164 may determine that data stored in a memory resource 134 of a particular database block 132 is skewed data, for example, if in a table join operation between two data tables in the particular database block 132, there is not enough space (e.g., memory resources) to allocate to a new table to store the result of the join operation, the new table may include a join operation of some of the two data tables but not all of them. Thus, the result of the join operation between these two data tables may be skewed. In this example, the skewed data corresponds to data that is generated from a joint operation of at least two data tables when there are not enough memory resources 134 available to be allocated to the joint operation leading a result of the joint operation to be skewed. In the present disclosure, unutilized memory resources 174, memory resources 134 storing duplicated data, and memory resources 134 storing skewed data may be referred to as unutilized memory resources 174.

In certain embodiments, upon monitoring the database blocks 132 to determine unutilized memory resources 174 to any of the database blocks 132, the processing engine 164 may provide suggestions for memory resources allocation to the second database block 132b from the identified unutilized memory resources 174.

In the example scenario of FIG. 2, assume the processing engine 164 determines that a subset of the first amount of memory resources 134a (that previously was allocated to the first database block 132a) is unutilized. For example, assume that the subset of first amount of memory resources 134a is 5 Gb. Thus, the processing engine 164 may reallocate the subset of first amount of memory resources 134a from the first database block 132a to the second database block 132b.

In an example where the subset of first amount of memory resources 134a is less than the second amount of memory resources 134b (i.e., the requested amount of memory resources 134b to be allocated to the second database block 132b), the processing engine 164 may allocate the rest of memory resources 134 to the second database block 132a from the database server 130 (or from the total available memory resources 134 associated with the database server 130). In this operation, the processing engine 164 may determine a difference between the second amount of memory resources 134b and the subset of first amount of memory resources 134a. The processing engine 164 may also determine that no other database blocks 132 is allocated with any portion of the total memory resources 134. The processing engine 164 may allocate the determined difference between the second amount of memory resources 134b and the subset of first amount of memory resources 134a from the database server 130 to the second database block 132b.

In the example scenario of FIG. 2, the processing engine 164 may determine that the difference between the second amount of memory resources 134b (e.g., 25 Gb) and the subset of first amount of memory resources 134a (e.g., 5 Gb) is a particular amount of memory resources 134 (e.g., 20 Gb). Thus, the processing engine 164 may allocate the particular amount of memory resources 134 from the available total memory resources 134 associated with the database server 130 to the second database block 132b. The processing engine 164 may perform the second task 106b using the second amount of memory resources 134b in the second database block 132b.

At the end of this example of allocating the second amount of memory resources 134b to the second database block 132b, the total available memory resources 134 maybe 855 Gb memory resources 134, the first database block 132a may be allocated with 120 Gb memory resources 134a, and the second database block 132b may be allocated with 25 Gb memory resources 134b.

In an example where the second amount of memory resources 134b is equal to the subset of amount of memory resources 134a, the processing engine 164 may not have to allocate (and/or reallocate) any memory resources 134 from the database server 130 and/or other database blocks 132 to the second database block 132b. Thus, the processing engine 164 may perform the second task 106b using the second amount of memory resources 134b in the second database block 132b.

Allocating Memory Resources to a Third Database Block From Unutilized Memory Resources Continuing the example scenario above, assume that the processing engine 164 receives a request 104c that indicates to allocate a third amount of memory resources 134c to the third database block 132c to perform a third task 106c. For example, the processing engine 164 may receive the request 104c from the computing device 120 when the user 102 initiates the request 104c. For example, assume that the third amount of memory resources 134c is 100 Gb.

In certain embodiments, the processing engine 164 may send this information (e.g., the request 104c) as a blockchain transaction 210c to the blockchain network 140. The blockchain transaction 210c may include details about the request 104c, such as it is requested to allocate the third amount of memory resources 134c to the third database block 132c to perform the third task 106c. The blockchain network 140 may generate a new block 142 to store information associated with the blockchain transaction 210c and the request 104c, similar to that described above in conjunction with generating new blocks 142b and 142c described in FIG. 3.

The processing engine 164 may monitor the database blocks 132 to determine whether any memory resource 134 allocated to any of the database blocks 132 is unutilized, store duplicated data, and/or store skewed data (collectively referred to herein as unutilized memory resources 174).

In the example of FIG. 2, assume that the processing engine 164 determines that a second subset of memory resources 134 allocated to one or more database blocks 132 is unutilized. The processing engine 164 may reallocate the second subset of memory resources 134 to the third database block 132c. For example, the processing engine 164 may determine that the first task 106a is completed in the first database block 132a, and the first amount of memory resources 134a previously allocated to the first database block 132a is no longer utilized to perform the task 106a. Thus, the processing engine 164 may reallocate the required amount of memory resources 134 (e.g., 100 Gb) from the first database block 132a to the third database block 132b. The processing engine 164 may perform the third task 106c using the third amount of memory resources 134c in the third database block 132c.

Since it is determined that the first amount of memory resources 134a previously allocated to the first database block 132a is no longer utilized, the processing engine 164 may revert the rest of the unutilized memory resources 174 from the database block 132a to the total memory resources 134 associated with the database server 130 indicating that the unutilized memory resources 174 are available to be allocated to any of the database blocks 132.

In certain embodiments, the processing engine 164 may continuously or periodically (e.g., every minute, every two minutes, or any other suitable interval) monitor the database blocks 132 to identify unutilized memory resources 174 allocated to any database block 132. In response, the processing engine 164 may add (e.g., move or revert) the identified unutilized memory resources 174 to the total memory resources 134 associated with the database server 130 indicating that the unutilized memory resources 174 are available to be allocated to any of the database blocks 132.

In certain embodiments, allocating memory resources 134 to database blocks 132 may be based on historical memory allocations 180. The historical memory allocations 180 may include historical requests 104 to allocate memory resources 134 to database blocks 132 to perform tasks 106. The historical memory allocations 180 may further include approval indications of memory allocations for performing tasks 106. For example, the approval indications may be provided by users 102 and/or data owners 310. For example, if the historical memory allocations 180 indicate that allocating the particular amount of memory resources 134 to perform a particular task 106 in a particular database block 132 was approved more than a threshold percentage of the time (e.g., more than 80%, 85%, etc.), in response to receiving a new request 104 to allocate memory resources 134 (within a threshold range (e.g., within ±5%, etc.) of the particular amount of memory resources 134 to the particular database block 132 to perform the particular task 106, the processing engine 164 may approve the request 104.

For example, allocating the first amount of memory resources 134a to the first database block 132a may be in response to determining that allocating the first amount of memory resources 134a to the first database block 132a can be approved based on the historical memory allocations 180 to perform the first task 106a. In another example, allocating the second amount of memory resources 134b to the second database block 132b may be in response to determining that allocating the second amount of memory resources 134b to the second database block 132b can be approved based on the training dataset 178, the historical memory allocations 180, and historical requests 104 to perform the second task 106b, similar to that described above.

In certain embodiments, allocating memory resources 134 to database blocks 132 may be based on historical blockchain transactions 210. For example, allocating the first amount of memory resources 134a to the first database block 132a may be in response to determining that allocating the first amount of memory resources 134a to the first database block 132a can be approved based on the historical blockchain transactions 210 to perform the first task 106a.

In certain embodiments, any information and/or data stored in any block 142 of the blockchain 140 may be distributed and shared between the blocks 142.

In certain embodiments, upon identifying memory resources 134 allocated to any of the database blocks 132 that are unutilized, store duplicate data, and/or store skewed data, the processing engine 164 may be configured to send this information as a blockchain transaction 210 to the blockchain network 140. This information may be shared between the blocks 142. For example, the processing engine 164 may suggest to one or more data owners 310 associated with one or more database blocks 132 that include memory resources 134 that store skewed data, to delete the duplicate data and/or skewed data.

In certain embodiments, the processing engine 164 may provide the suggestion of detecting the duplicate data and/or skewed data as a blockchain transaction 210 to the blockchain network 140. The data owner 310a associated with the block 142a may use this information to approve, revise, or override the suggestion of the processing engine 164. The processing engine 164 may learn from the action of the data owner 310a, and include the result of the suggestion to the training dataset 178 to be used for future suggestions and memory resource allocations indicated in future requests 104.

In certain embodiments, upon receiving a request 104 to allocate a particular amount of memory resources 134 to a particular database block 132 to perform a particular task 106, the processing engine 164 may be configured to determine a combination of memory resources 134 and/or unutilized memory resources 174 to be allocated (or reallocated) to the particular database block 132.

In one example, the processing engine 164 may provide multiple suggestions of memory resource allocations. In another example, the processing engine 164 may determine a more optimal memory resource allocation from among the multiple possible memory resources allocations. The more optimal memory resource allocation may correspond to a memory resource allocation where memory resources 134 from database blocks 132 that are unutilized, store duplicate data, and/or store skewed data are prioritized to be used for memory resource reallocation (over the total available memory resources 134 of the database server 130), and the remaining of the memory resources for the memory resource allocation may be taken from the total memory resources 134 available at the database server 130.

In certain embodiments, the processing engine 164 may be configured to hold or suspend a particular task 106 that is determined to require more than a threshold amount of memory resources 134 (e.g., more than anticipated) due to skewness of data created in the middle of the execution of the task 106. In response, the processing engine 164 may allocate more memory resources 134 to a database block 132 in which the task 106 is being performed until the required amount of memory resources 134 (e.g., the threshold amount of memory resources 134) to perform the particular task 106 is available to perform the particular task 106.

Generating Blocks in a Blockchain for Memory Resource Allocations

FIG. 3 illustrates an example operational flow 300 for generating blocks 142 in a blockchain 140 for memory resource allocations to database blocks 132. Aspects of the operational flow 300 are described above, and additional aspects are described below. The operational flow 300 illustrates the process of generating the block 142b in response to receiving the request 104a and the approval of generation of the block 142b. The block 142b may include the blockchain transaction 210a, memory resource allocation to database block 132a, block ID 150b, hash 152b of the previous block 142a, and/or any other data described herein. The block 142b may be generated similar to that described above in FIG. 1. The operational flow 300 further illustrates the process of generating the block 142c in response to receiving the request 104b and the approval of the generation of the block 142c. Although, FIG. 3 is described with respect to generating blocks 142a and 142b, it should be understood that the operational flow 300 may further include generating any number of blocks 142 in response to receiving a new request 104 and approval of generation of the new blocks 142.

Example Method for Improving Memory Allocations for Performing Tasks

FIG. 4 illustrates an example flowchart of a method 400 for memory resource allocation improvement and optimization for performing tasks 106. Modifications, additions, or omissions may be made to method 400. Method 400 may include more, fewer, or other operations. For example, operations may be performed in parallel or in any suitable order. While at times discussed as the system 100, processor 162, processing engine 164, or components of any of thereof performing operations, any suitable system or components of the system may perform one or more operations of the method 400. For example, one or more operations of method 400 may be implemented, at least in part, in the form of software instructions 170 of FIG. 1, stored on non-transitory, tangible, machine-readable media (e.g., memory 168 of FIG. 1) that when run by one or more processors (e.g., processor 162 of FIG. 1) may cause the one or more processors to perform operations 402-420.

Method 400 begins at 402 where the processing engine 164 receives a first request 104a to allocate a first amount of memory resources 134a to the first database block 132a to perform a first task 106a, where the first database block 132a is one of database blocks 132 of the database server 130. For example, the processing engine 164 may receive the first request 104a from the computing device 120, similar to that described in FIG. 1.

At 404, the processing engine 164 allocates the first amount of memory resources 134a to the first database block 132a. In one embodiment, this process may be in response to receiving an approval of the first request 104a, for example, by the processing engine 164 and/or an operator associated with the database server 130, similar to that described in FIGS. 1-3.

At 406, the processing engine 164 performs the first task 106a using the first amount of memory resources 34a.

At 408, the processing engine 164 receives a second request 104b to allocate a second amount of memory resources 134b to a second database block 132b to perform a second task 106b, where the second database block 132b is one or database blocks 132 of the database server 130. For example, the processing engine 164 may receive the second request 104b from the computing device 120, similar to that described in FIGS. 1-3.

At 410, the processing engine 164 determines whether the second request 104b is be approved. In one embodiment, the processing engine 164, via the machine learning module 176, may determine whether the second request 104b can be approved (or is approved) by extracting features of the second request 104b and comparing the features of the second request 104b with features of historical tasks 106 stored in training dataset 178, similar to that described in FIGS. 1-3. If it is determined that the second request 104b is approved, method 400 proceeds to 414. Otherwise, method 400 proceeds to 412.

At 412, the processing engine 164 does not allocate the second amount of memory resources 134b to the second database block 132b.

At 414, the processing engine 164 determines whether any portion of memory resources 134 allocates to any database block 132 is unutilized. In this process, the processing engine 164 monitors the memory resource utilization of the database blocks 132. The processing engine 164 may also determine whether any memory resources 134 allocated to any database block 132 stores duplicated data and/or skewed data, similar to that described in FIGS. 1-3. If it is determined that a portion of memory resources 134 allocated to any database block 132 is unutilized, method 400 proceeds to 418. Otherwise, method 400 proceeds to 416.

At 416, the processing engine 164 allocates the second amount of memory resources 134b from the total memory resources 134 associated with the database server 130 to the second database block 132b. The processing engine 164 may then perform the second task 106b using the second amount of memory resources 134b, similar to that described in FIGS. 1-3.

At 418, the processing engine 164 determines that a subset of the first amount of memory resources 134a is unutilized, similar to that described in FIGS. 1-3. In this process, the processing engine 164 monitors memory resource allocations and utilizations in the database blocks 132.

At 420, the processing engine 164 reallocates the subset of the first amount of memory resources 134a to the second database block 132b. The processing engine 164 may determine the difference between the subset of first amount of memory resources 134a and the second amount of memory resources 134b, and allocate the determined difference memory resources from the database server 130 to the second database block 132b, similar to that described in FIGS. 1-3. The processing engine 164 may perform the second task 106b using the second amount of memory resources 134b in the second database block 132b.

In one embodiment, if the processing engine 164 determines that a subset of the first amount of memory resources 134a store duplicated data, the processing engine 164 may suggest removing the duplicated data to an operator or a user associated with the first database block 132a. Upon the removal of the duplicated data, the processing engine 164 may reallocate the subset of first amount of memory resources 134a to any database block 132 (e.g., database block 132b) where memory resources 134 are needed to perform a task 106.

In one embodiment, if the processing engine 164 determines that a subset of the first amount of memory resources 134a store skewed data, the processing engine 164 may suggest removing the skewed data to an operator or a user associated with the first database block 132a. Upon the removal of the skewed data, the processing engine 164 may reallocate the subset of first amount of memory resources 134a to any database block 132 (e.g., database block 132b) where memory resources 134 are needed to perform a task 106.

Example Method for Improving Memory Resource Allocation in Database Blocks of a Database Server Using Blockchain FIG. 5 illustrates an example flowchart of a method 500 for improving (e.g., optimizing) memory resource allocation in database blocks 132 of a database server 130 using blockchain 140. Modifications, additions, or omissions may be made to method 500. Method 500 may include more, fewer, or other operations. For example, operations may be performed in parallel or in any suitable order. While at times discussed as the system 100, processor 162, processing engine 164, blockchain network 140, or components of any of thereof performing operations, any suitable system or components of the system may perform one or more operations of the method 500. For example, one or more operations of method 500 may be implemented, at least in part, in the form of software instructions 170 of FIG. 1, stored on non-transitory, tangible, machine-readable media (e.g., memory 168 of FIG. 1) that when run by one or more processors (e.g., processor 162 of FIG. 1) may cause the one or more processors to perform operations 502-528.

Method 500 begins at 502 when the processing engine 164 receives a first request 104a to allocate a first amount of memory resources 134a to the first database block 132a to perform a first task 106a, where the first database block 132a is one of database blocks 132 of the database server 130. For example, the processing engine 164 may receive the first request 104a from the computing device 120, similar to that described in FIG. 1.

At 504, the processing engine 164 communicates a first blockchain transaction 210a to the first block 142a in the blockchain network 140, where the first blockchain transaction 210a comprises the first request 104a, similar to that described in FIGS. 2 and 3.

At 506, the processing engine 164 approves the first blockchain transaction 210a based on historical memory resource allocations 180 to perform the first task 106a using the first amount of memory resources 134a. In one embodiment, the data owner 310a associated with the first block 132a may approve the blockchain transaction 210a. The processing engine 164 may receive a message that the blockchain transaction 210a is approved, e.g., from the first block 142a or the blockchain network 140. In one embodiment, the processing engine 164 may approve the first blockchain transaction 210a based on historical memory resource allocations 180, historical blockchain transactions 210 and their respective approval/disapproval indications, among other information associated with the historical blockchain transactions 210, similar to that described in FIGS. 2 and 3.

At 508, the processing engine 164 receives a first message 312a from the first block that indicates a second block 142b is generated in the blockchain network 140. The generation of the second block 142b is in response to the blockchain transaction 210a being approved, similar to that described in FIGS. 2-3. The second block 142b stores allocation of the first amount of memory resources 134a to the first database block 132a. The block 142b is associated with the database block 132a.

At 510, the processing engine 164 performs the first task 106a using the first amount of memory resources 134a. The processing engine 164 performs the first task 106a in the first database block 132a, similar to that described in FIGS. 2 and 3.

At 512, the processing engine 164 receives a second request 104b to allocate a second amount of memory resources 134b to a second database block 132b to perform a second task 106b, where the second database block 132b is one or database blocks 132 of the database server 130. For example, the processing engine 164 may receive the second request 104b from the computing device 120, similar to that described in FIGS. 1-3.

At 514, the processing engine 164 determines whether the second request 104b can be approved. In one embodiment, the processing engine 164, via the machine learning module 176, may determine whether the second request 104b can be approved (or is approved) by extracting features of the second request 104b and comparing the features of the second request 104b with features of historical tasks 106 stored in training dataset 178, similar to that described in FIGS. 1-3. If it is determined that the second request 104b is approved, method 500 proceeds to 518. Otherwise, method 500 proceeds to 516.

At 516, the processing engine 164 does not allocate the second amount of memory resources 134b to the second database block 132b.

At 518, the processing engine 164 determines whether any portion of memory resources 134 allocates to any database block 132 is unutilized. In this process, the processing engine 164 monitors the memory resource utilization of the database blocks 132. The processing engine 164 may also determine whether any memory resources 134 allocated to any database block 132 stores duplicated data and/or skewed data, similar to that described in FIGS. 1-3. If it is determined that a portion of memory resources 134 allocated to any database block 132 is unutilized, method 500 proceeds to 522. Otherwise, method 500 proceeds to 520.

At 520, the processing engine 164 allocates the second amount of memory resources 134b from the total memory resources 134 associated with the database server 130 to the second database block 132b. The processing engine 164 may then perform the second task 106b using the second amount of memory resources 134b, similar to that described in FIGS. 1-3.

At 522, the processing engine 164 determines that a subset of the first amount of memory resources 134a is unutilized, similar to that described in FIGS. 1-3. In this process, the processing engine 164 monitors memory resource allocations and utilizations in the database blocks 132.

At 524, the processing engine 164 communicates a second blockchain transaction 210b to the first block 132a, where the second blockchain transaction 210b comprises the second request 104b, similar to that described in FIGS. 2 and 3.

At 526, the processing engine 164 approves the second blockchain transaction 210b based on historical memory resource allocations to perform the second task 106b using the second amount of memory resources 134b. In one embodiment, the data owner 310a associated with the first block 132a may approve the blockchain transaction 210b. The processing engine 164 may receive a message that the blockchain transaction 210b is approved, e.g., from the first block 142a or the blockchain network 140. In one embodiment, the processing engine 164 may approve the blockchain transaction 210b based on historical memory resource allocations 180, historical blockchain transactions 210 and their respective approval/disapproval indications, among other information associated with the historical blockchain transactions 210, similar to that described in FIGS. 2 and 3.

At 528, the processing engine 164 receives a second message 312b from the first block 132a that indicates a third block 142c is generated in the blockchain network 140. The generation of the third block 142c is in response to the blockchain transaction 210b being approved, similar to that described in FIGS. 2-3. The third block 142c stores reallocation of the subset of the first amount of memory resources 134a to the second database block 132b. The third block 142c is associated with the second database block 132b.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for improving memory resource allocation within a database server comprising:
a database server comprising a plurality of database blocks, wherein:
the database server is associated with total memory resources;
each of the plurality of database blocks is configured to be used to perform a different task; and
the plurality of database blocks comprises a first database block and a second database block; and
a processor communicatively coupled with the database server and configured to:
receive a first request to allocate a first amount of memory resources from among the total memory resources to the first database block to perform a first task;
allocate the first amount of memory resources to the first database block;
perform the first task using the first amount of memory resources;
monitor the first database block to determine whether any portion of the first amount of memory resources is not utilized;
determine that a subset of the first amount of memory resources is not utilized;
determine an updated amount of memory resources utilized by the first database block to perform the first task, wherein the updated amount of memory resources corresponds to the first amount of memory resources without the subset of first amount of memory resources;
extract a first set of features from the first request, wherein the first set of features represents at least one of the first task and the first database block, wherein the first set of features is represented by a first feature vector comprising numerical values;
associate the first set of features to the updated amount of memory resources;
receive a second request to perform a second task;
extract a second set of features from the second request, wherein the second set of features indicates at least the second task, wherein the second set of features is represented by a second feature vector comprising numerical values;
compare each of the first set of features with a counterpart feature from among the second set of features;
determine that more than a threshold amount of first set of features corresponds to counterpart features from the second set of features; and
in response to determining that more than the threshold amount of first set of features corresponds to the counterpart features from among the second set of features, allocate the updated amounted amount of memory resources to the second task.

2. The system of claim 1, wherein:
the second amount of memory resources is equal to the subset of the first amount of memory resources; and
the processor is further configured to perform the second task using the subset of the first amount of memory resources.

3. The system of claim 1, wherein the processor is further configured to:
identify unutilized memory resources from memory resources allocated to any of the plurality of database blocks; and revert the unutilized memory resources to the total memory resources such that the unutilized memory resources are available to be allocated to any of the plurality of database blocks.

4. The system of claim 1, wherein:
the database server further comprises a third database block; and
the processor is further configured to:
receive a third request to allocate a third amount of memory resources to the third database block to perform a third task;
monitor other database blocks of the database server comprising the first database block and the second database block to determine whether any portion of memory resources allocated to the other database blocks is not utilized;
determine that a second subset of memory resources allocated to the other database blocks is not utilized;
reallocate the second subset of memory resources to the third database block; and
perform the third task using the second subset of memory resources.

5. The system of claim 1, wherein:
the second amount of memory resources is more than the subset of the first amount of memory resources; and
the processor is further configured to:
determine a fourth amount of memory resources that corresponds to a difference between the second amount of memory resources and the subset of the first amount of memory resources;
determine that no other database block is allocated with a portion of the total memory resources;
allocate the fourth amount of memory resources to the second database block from the total memory resources; and
perform the second task using the subset of the first amount of memory resources and the fourth amount of memory resources.

6. The system of claim 1, wherein:
allocating the first amount of memory resources to the first database block is in response to determining that allocating the first amount of memory resources to the first database block is approved based at least in part upon historical allocations of memory resources of the total memory resources to perform the first task; and
reallocating the subset of the first amount of memory resources to the second database block is in response to determining that reallocating the subset of the first amount of memory resources to the second database block is approved based at least in part upon historical allocations of memory resources of the total memory resources to perform the second task.

7. The system of claim 1, wherein the processor is further configured to:
monitor the plurality of database blocks to identify first particular memory resources allocated to any of the plurality of database blocks that store duplicated data; and
in response to identifying the first particular memory resources that store the duplicated data, provide a suggestion to delete the duplicated data.

8. A method for improving memory resource allocation within a database server comprising:
receiving a first request to allocate a first amount of memory resources from among a total memory resources of a database server to a first database block to perform a first task, wherein:

the database server comprises a plurality of database blocks;
each of the plurality of database blocks is configured to be used to perform a different task; and
the plurality of database blocks comprises the first database block and a second database block;
allocating the first amount of memory resources to the first database block;
performing the first task using the first amount of memory resources;
monitoring the first database block to determine whether any portion of the first amount of memory resources is not utilized;
determining that a subset of the first amount of memory resources is not utilized;
determining an updated amount of memory resources utilized by the first database block to perform the first task, wherein the updated amount of memory resources corresponds to the first amount of memory resources without the subset of first amount of memory resources;
extracting a first set of features from the first request, wherein the first set of features represents at least one of the first task and the first database block, wherein the first set of features is represented by a first feature vector comprising numerical values;
associating the first set of features to the updated amount of memory resources;
receiving a second request to perform a second task;
extracting a second set of features from the second request, wherein the second set of features indicates at least the second task, wherein the second set of features is represented by a second feature vector comprising numerical values;
comparing each of the first set of features with a counterpart feature from among the second set of features;
determining that more than a threshold amount of first set of features corresponds to counterpart features from the second set of features; and
in response to determining that more than the threshold amount of first set of features corresponds to the counterpart features from among the second set of features, allocating the updated amounted amount of memory resources to the second task.

9. The method of claim 8, wherein:
the second amount of memory resources is equal to the subset of the first amount of memory resources; and
the method further comprises performing the second task using the subset of the first amount of memory resources.

10. The method of claim 8, further comprising:
identifying unutilized memory resources from memory resources allocated to any of the plurality of database blocks; and
reverting the unutilized memory resources to the total memory resources such that the unutilized memory resources are available to be allocated to any of the plurality of database blocks.

11. The method of claim 8, further comprising:
receiving a third request to allocate a third amount of memory resources to a third database block of the database server to perform a third task;
monitoring other database blocks of the database server comprising the first database block and the second database block to determine whether any portion of memory resources allocated to the other database blocks is not utilized;

determining that a second subset of memory resources allocated to the other database blocks is not utilized;
reallocating the second subset of memory resources to the third database block; and
performing the third task using the second subset of memory resources.

12. The method of claim 8, wherein:
the second amount of memory resources is more than the subset of the first amount of memory resources; and
the method further comprises:
   determining a fourth amount of memory resources that corresponds to a difference between the second amount of memory resources and the subset of the first amount of memory resources;
   determining that no other database block is allocated with a portion of the total memory resources;
   allocating the fourth amount of memory resources to the second database block from the total memory resources; and
   performing the second task using the subset of the first amount of memory resources and the fourth amount of memory resources.

13. The method of claim 8, wherein:
allocating the first amount of memory resources to the first database block is in response to determining that allocating the first amount of memory resources to the first database block is approved based at least in part upon historical allocations of memory resources of the total memory resources to perform the first task; and
reallocating the subset of the first amount of memory resources to the second database block is in response to determining that reallocating the subset of the first amount of memory resources to the second database block is approved based at least in part upon historical allocations of memory resources of the total memory resources to perform the second task.

14. The method of claim 8, further comprising:
monitoring the plurality of database blocks to identify second particular memory resources allocated to any of the plurality of database blocks that store skewed data, wherein the skewed data corresponds to data that is generated from a joint operation of at least two data tables when there is not enough memory resources available to be allocated to the joint operation; and
in response to identifying the second particular memory resources that store the skewed data, providing a suggestion to delete the skewed data.

15. A non-transitory computer-readable medium storing instructions that when executed by a processor cause the processor to:
   receive a first request to allocate a first amount of memory resources from among a total memory resources of a database server to a first database block to perform a first task, wherein:
      the database server comprises a plurality of database blocks;
      each of the plurality of database blocks is configured to be used to perform a different task; and
      the plurality of database blocks comprises the first database block and a second database block;
   allocate the first amount of memory resources to the first database block;
   perform the first task using the first amount of memory resources;
   monitor the first database block to determine whether any portion of the first amount of memory resources is not utilized;
   determine that a subset of the first amount of memory resources is not utilized;
   determine an updated amount of memory resources utilized by the first database block to perform the first task, wherein the updated amount of memory resources corresponds to the first amount of memory resources without the subset of first amount of memory resources;
   extract a first set of features from the first request, wherein the first set of features represents at least one of the first task and the first database block, wherein the first set of features is represented by a first feature vector comprising numerical values;
   associate the first set of features to the updated amount of memory resources;
   receive a second request to perform a second task;
   extract a second set of features from the second request, wherein the second set of features indicates at least the second task, wherein the second set of features is represented by a second feature vector comprising numerical values;
   compare each of the first set of features with a counterpart feature from among the second set of features;
   determine that more than a threshold amount of first set of features corresponds to counterpart features from the second set of features; and
   in response to determining that more than the threshold amount of first set of features corresponds to the counterpart features from among the second set of features, allocate the updated amounted amount of memory resources to the second task.

16. The non-transitory computer-readable medium of claim 15, wherein:
the second amount of memory resources is equal to the subset of the first amount of memory resources; and
the instructions further cause the processor to perform the second task using the subset of the first amount of memory resources.

17. The non-transitory computer-readable medium of claim 15, wherein the instructions further cause the processor to:
   identify unutilized memory resources from memory resources allocated to any of the plurality of database blocks; and
   revert the unutilized memory resources to the total memory resources such that the unutilized memory resources are available to be allocated to any of the plurality of database blocks.

18. The non-transitory computer-readable medium of claim 15, wherein:
the database server further comprises a third database block; and
the instructions further cause the processor to:
   receive a third request to allocate a third amount of memory resources to the third database block to perform a third task;
   monitor other database blocks of the database server comprising the first database block and the second database block to determine whether any portion of memory resources allocated to the other database blocks is not utilized;
   determine that a second subset of memory resources allocated to the other database blocks is not utilized;
   reallocate the second subset of memory resources to the third database block; and
   perform the third task using the second subset of memory resources.

19. The non-transitory computer-readable medium of claim 15, wherein:
the second amount of memory resources is more than the subset of the first amount of memory resources; and
the instructions further cause the processor to:
determine a fourth amount of memory resources that corresponds to a difference between the second amount of memory resources and the subset of the first amount of memory resources;
determine that no other database block is allocated with a portion of the total memory resources;
allocate the fourth amount of memory resources to the second database block from the total memory resources; and
perform the second task using the subset of the first amount of memory resources and the fourth amount of memory resources.

20. The non-transitory computer-readable medium of claim 15, wherein:
allocating the first amount of memory resources to the first database block is in response to determining that allocating the first amount of memory resources to the first database block is approved based at least in part upon historical allocations of memory resources of the total memory resources to perform the first task; and
reallocating the subset of the first amount of memory resources to the second database block is in response to determining that reallocating the subset of the first amount of memory resources to the second database block is approved based at least in part upon historical allocations of memory resources of the total memory resources to perform the second task.

* * * * *